United States Patent
Koepff et al.

(10) Patent No.: US 6,511,115 B2
(45) Date of Patent: Jan. 28, 2003

(54) ARRANGEMENT FOR RAPID SECURING OF AN APPARATUS IN AN INSTALLATION OPENING IN A CENTRAL CONSOLE OR THE LIKE OF A MOTOR VEHICLE

(75) Inventors: Ralf Koepff, Dornstetten (DE); Roland Gaenssler, Freudenstadt (DE); Andreas Schneider, Freudenstadt (DE); Steffen Breunig, Pforzheim (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/854,032

(22) Filed: May 11, 2001

(65) Prior Publication Data

US 2001/0054828 A1 Dec. 27, 2001

(30) Foreign Application Priority Data

May 18, 2000 (DE) .......................................... 100 24 641

(51) Int. Cl.⁷ .............................. B60R 7/06; B60R 11/02
(52) U.S. Cl. .................. 296/24.1; 296/37.8; 296/37.12; 248/551
(58) Field of Search ............................... 296/24.1, 37.8, 296/37.12, 70; 248/551

(56) References Cited

U.S. PATENT DOCUMENTS

| | | | | |
|---|---|---|---|---|
| 4,169,624 A | * | 10/1979 | Yefsky et al. | 296/37.12 |
| 4,982,810 A | * | 1/1991 | Toy | 296/70 |
| 4,991,818 A | * | 2/1991 | Darbo et al. | 248/661 |
| 5,137,321 A | * | 8/1992 | Landry et al. | 296/24.1 |
| 5,152,496 A | * | 10/1992 | Kobayashi | 248/551 |
| 5,169,097 A | * | 12/1992 | Yasukawa | 248/27.1 |
| 5,184,489 A | * | 2/1993 | Squires et al. | 296/37.12 |
| 5,386,636 A | * | 2/1995 | Asano | 296/37.12 |
| 5,524,859 A | * | 6/1996 | Squires et al. | 248/551 |
| 5,560,572 A | * | 10/1996 | Osborn et al. | 248/27.1 |
| 5,779,197 A | * | 7/1998 | Kim | 296/70 |

* cited by examiner

Primary Examiner—D. Glenn Dayoan
Assistant Examiner—Greg Blankenship
(74) Attorney, Agent, or Firm—Michael J. Striker

(57) ABSTRACT

The invention relates to an arrangement (10) for rapid securing of an apparatus (12) such as, for example, a car radio or a navigation device, in an installation opening (14) in a motor vehicle. The invention proposes providing the apparatus (12) with laterally projecting brackets (22), over which slide members (30) arranged at the sides of the apparatus (12) engage in a locking position. In a mounting position, the slide members (30) release the brackets (22) so that the apparatus (12) can be pulled out of the installation opening (14) and inserted therein. (FIG. 2)

8 Claims, 2 Drawing Sheets

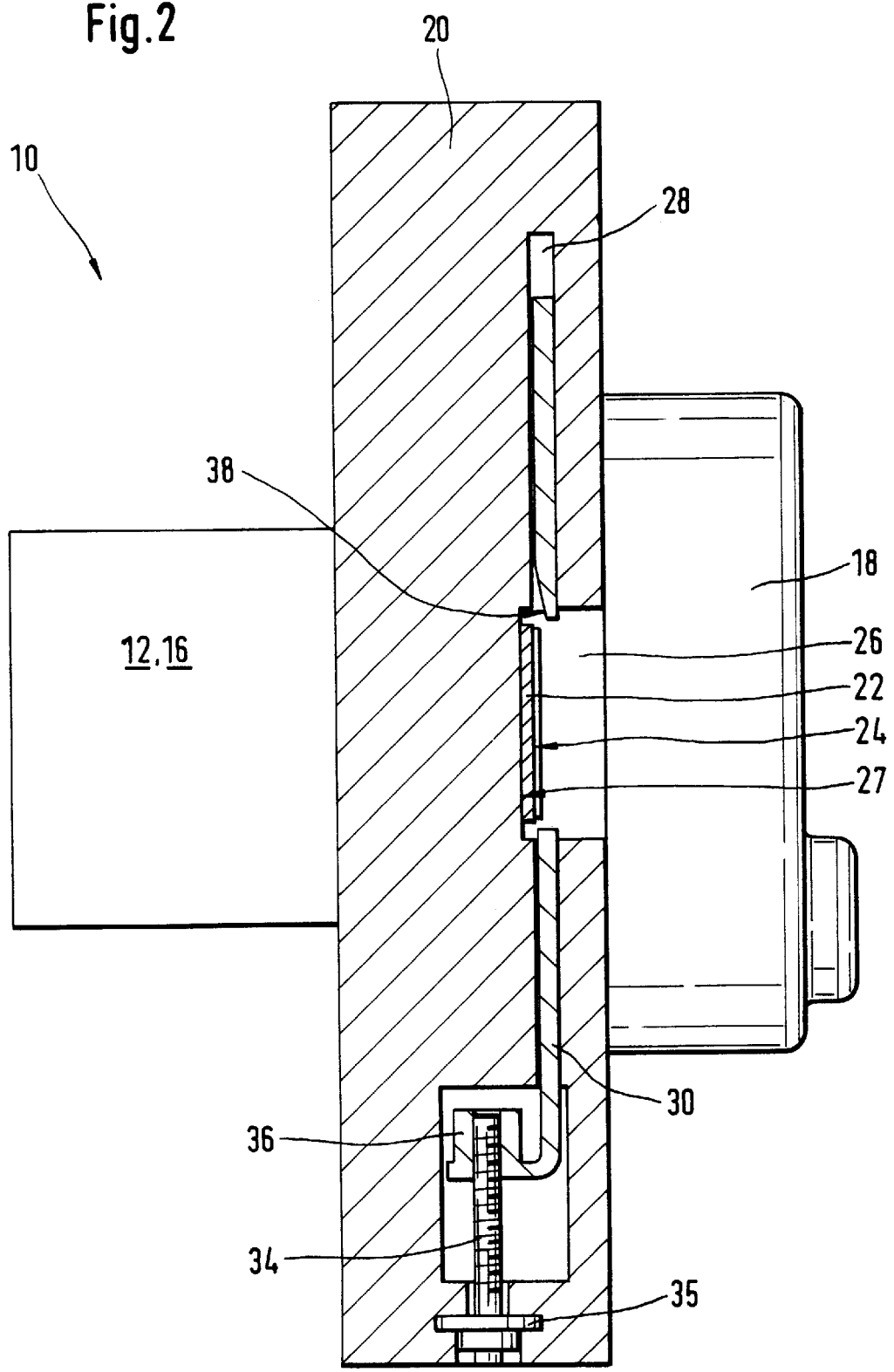

ARRANGEMENT FOR RAPID SECURING OF AN APPARATUS IN AN INSTALLATION OPENING IN A CENTRAL CONSOLE OR THE LIKE OF A MOTOR VEHICLE

BACKGROUND OF THE INVENTION

The invention relates to an arrangement for rapid securing of an apparatus in an installation opening, for example, in a central console of a motor vehicle.

The apparatus to be installed may be, for example, a car radio, a CD player, a navigation device. Motor vehicles have standardized installation openings for the installation of such apparatuses in the central console, in a dashboard or other suitable position, into which installation openings the apparatus can be inserted. To secure it, the apparatus can be screwed into the installation opening. The disadvantage of screw-fixing, however, is that it is time-consuming and hence expensive.

SUMMARY OF THE INVENTION

The problem underlying the invention is to propose an arrangement for rapid securing of an apparatus in an installation opening.

The problem is solved according to the invention by the features of claim 1. According to the invention, the apparatus has a locking surface facing away from the direction of insertion of the apparatus. "Direction of insertion" is intended to mean the direction in which the apparatus is inserted into the installation opening. "Facing away" means that the locking surface faces backwards relative to the direction of insertion, that is to say it faces an operating surface of the apparatus or, when an apparatus has been inserted into the installation opening, faces the passenger area of the motor vehicle. The installation opening has at least one slide member arranged at one side of the apparatus, which can be pushed back and forth between a mounting position and a locking position. In the locking position, the slide member engages over the locking surface of the apparatus so that the apparatus cannot be retracted from the installation opening. In the locking position, the slide member holds the apparatus securely locked in the installation opening. In the mounting position, the slide member releases the locking surface so that the apparatus can be retracted from the installation opening or inserted into the installation opening.

The invention has the advantage that the apparatus is installed in the installation opening by inserting the apparatus into the installation opening and then displacing the slide member from the mounting position to the locking position. The apparatus can be installed simply and quickly. A further advantage of the invention is that the locking surface and the slide member can be given a large surface area and made stable, so that the apparatus is held securely in the installation opening. The arrangement according to the invention can, without difficulty, be so constructed that it holds the apparatus in the installation opening even at high accelerations of >30 g (30 times the acceleration of gravity), as can occur in the case of a rear impact.

The locking surface of the apparatus is preferably formed on a laterally projecting bracket, lug or the like. Such a bracket, lug or the like can be manufactured simply and at negligible cost during manufacture of a metal or plastics housing for the apparatus.

In order to hold the apparatus stably and securely in the installation opening, in an embodiment of the invention there are two or more locking surfaces on sides of the apparatus remote from one another, over which locking surfaces there engages a slide member, which is, for example C- or U-shaped, or a plurality of slide members, engaging around the apparatus.

In an embodiment of the invention, the locking surface projects from the side of the apparatus.

In a preferred embodiment of the invention, the slide member has a sliding-engagement surface that extends at an angle relative to the sliding direction of the slide member. On displacement of the slide member from the mounting position to the locking position, the sliding-engagement surface acts in the manner of a wedge, that is to say it slides along the locking surface of the apparatus and presses the apparatus against an abutment.

The apparatus is thus clamped securely in the installation opening. That embodiment of the invention prevents the apparatus from rattling.

The invention will be explained hereinafter with reference to an embodiment shown in the drawings

BRIEF DESCRIPTION OF THE DRAWINGS

FIG. 2 is a side view of the arrangement of FIG. 1.

DESCRIPTION OF THE PREFERRED EMBODIMENTS

Figure 1:
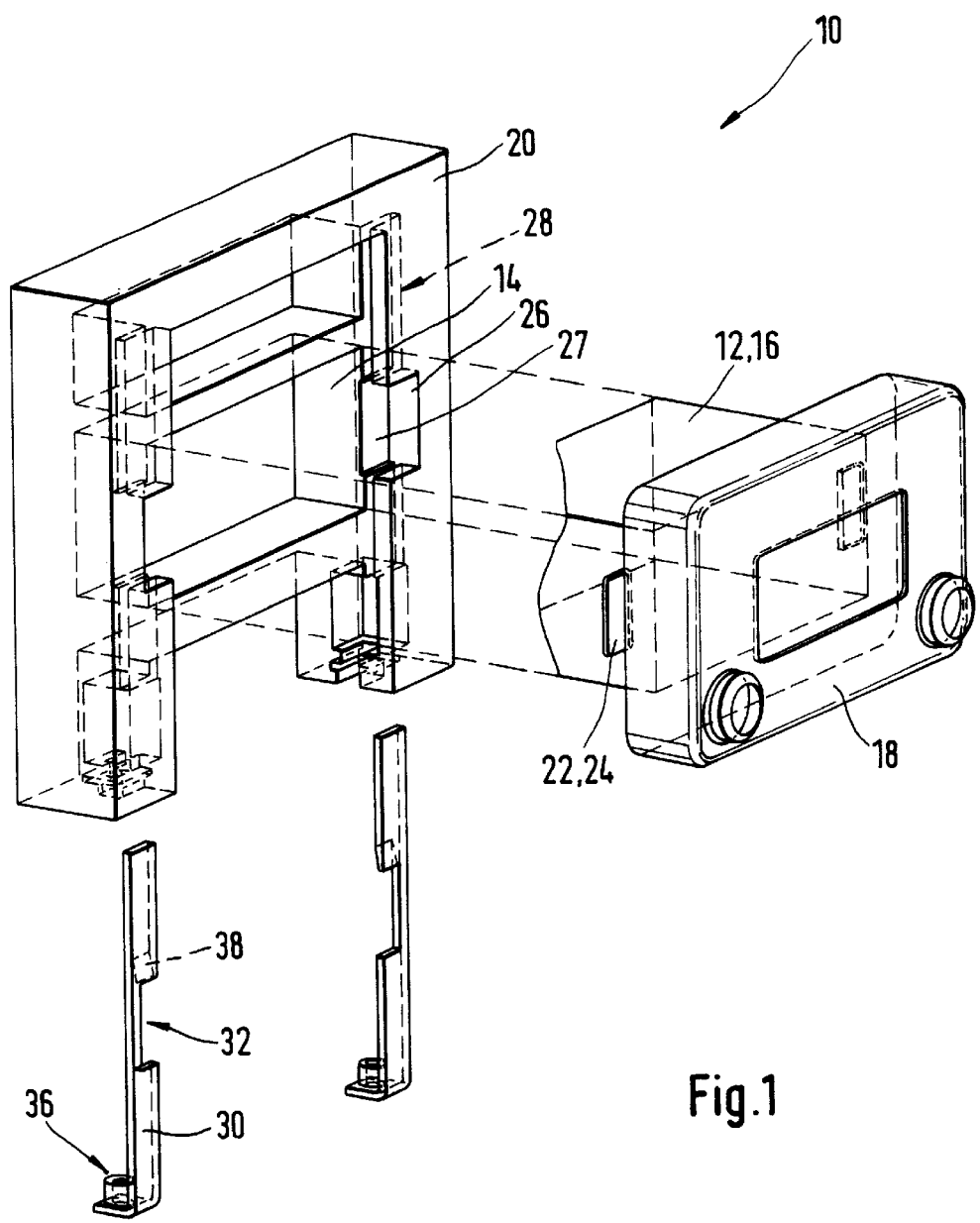
FIG. 1 is an explained perspective view of an arrangement according to the invention.

The arrangement 10 according to the invention, shown in the drawings, is used for the rapid securing of an apparatus 12 in an installation opening 14. The apparatus 12 is, for example, a car radio or a navigation device. It has a parallelipipedal housing 16, which is approximately square in plan view and rectangular in cross-section, attached to the front side of which housing there is an operating and display panel 18, which projects laterally and above and below the housing 16. The installation opening 14 is formed in a holding frame 20 which is fastened, for example, in a central console or dashboard (not shown) of a motor vehicle. The holding opening 14 can alternatively be part of the central console (not shown) or of the dashboard (not shown). In that case a separate holding frame 20 is no longer necessary. The installation opening 14 is in the form of an opening of rectangular cross-section and is complementary to the apparatus 12. The apparatus 12 can be inserted into the installation opening 14 until the projecting operating and display panel 18 comes to rest against the holding frame 20.

There are formed on the housing 16 of the apparatus 12 laterally projecting brackets 22, which are arranged spaced from the operating and display panel 18. Surfaces of the brackets 22 that face the operating and display panel 18 form locking surfaces 24 for the apparatus 12.

The holding frame 20 is provided with recesses 26 for the brackets 22. The recesses 26 are arranged on both sides of the installation opening 14 and are open both in the direction of the installation opening 14 and in the direction of the front side of the holding frame 20, that is to say in the direction of the operating and display panel 18 of the apparatus 12. As the apparatus 12 is inserted into the installation opening 14, the brackets 22 of the apparatus 12 fit into the recesses 26 of the holding frame 20. Unlike the installation opening 14, the recesses 26 do not penetrate through the holding frame 20; instead the recesses 26 are deep enough for the brackets 22 to rest against a base 27 of the recesses 26 when the apparatus 12 has been inserted into the installation opening 14 (see FIG. 2).

On both sides of the installation opening 14, the holding frame 20 has slots 28 in which slide members 30, consisting of metal strips, are positioned displaceably transverse to the direction of insertion of the apparatus 12. The slots 28 cross over the recesses 26 at a distance from the base 27 of the recesses 26, that distance being a little less than the thickness of one bracket 22. The slide members 30 are provided with through openings 32 for the brackets 22 of the apparatus 12, the through openings being open at the side of the slide members 30 that faces the apparatus 12 or the installation opening 14. The slide members 30 can be displaced back and forth between a mounting position (shown in FIG. 2) and a locking position (not shown). In the mounting position the through openings 32 are in registration with the recesses 26 of the holding frame 20 for the laterally projecting brackets 22 of the apparatus 12. In the locking position (not shown), the slide members 30 cover the recesses 26 at least in part. Relative to the mounting position shown in FIG. 2, the locking position is displaced downwards.

In order to displace the slide members 30, the arrangement 10 according to the invention has screws 34 that are held captive in the holding frame 20 to be rotatable by their head 35 (FIG. 2). The screws 34 are screwed into threaded bushes 36 of the slide members 30, the threaded bushes 36 being arranged at ends of the slide members 30 that are bent round at right angles. The slide members 30 can be displaced back and forth between the mounting position and the locking position by turning the screws 34.

At one end of the through openings 32, the slide members 30 are provided with sliding-engagement surfaces 38, which are in the form of oblique surfaces 38 in the embodiment shown. The oblique surfaces 38 are provided on faces of the slide members 30 that face the base 27 of the recesses 26 of the holding frame 20. The arrangement 10 according to the invention functions as follows. For rapid securing of the apparatus 12 in the installation opening 14, the slide members 30 are in the mounting position (shown in FIG. 2), in which the through openings 32 of the slide members 30 for the brackets 22 of the apparatus 12 are in registration with the recesses 26 of the holding frame 20. The apparatus 12 is inserted together with its housing 16 into the installation opening 14 until the operating and display panel 18 comes to rest against the holding frame 20 and the brackets 22 projecting laterally from the housing 16 of the apparatus 12 come to rest against the base 27 of the recesses 26. By turning the screws 34, the two slide members 30 are then moved to the locking position in which they engage over the locking surfaces 24 of the brackets 22 and as a result hold the apparatus 12 securely locked in the installation opening 14. Upon displacement of the slide members 30 from the mounting position to the locking position, the oblique surfaces 38 slide along the locking surfaces 24 of the brackets 22. In so doing, the oblique surfaces 38 of the slide members 30 act in the manner of wedges and press the brackets 22 of the apparatus 12 against the base 27 of the recesses 26 so that the brackets 22 are clamped securely between the slide members 30 and the base 27 of the recesses 26. This prevents the apparatus 12 from rattling. The base 27 of the recesses 26 forms an abutment 27 for the laterally projecting brackets 22 of the apparatus 12.

What is claimed is:

1. A securing arrangement for a motor vehicle, comprising means forming an installation opening in a motor vehicle; an apparatus inserted in said installation opening so as to be rapidly secured in the latter, said apparatus having at least one locking surface which faces away from a direction of insertion of said apparatus, said installation opening having at least one slide member which engages over said locking surface of said apparatus in a locking position, so that said apparatus can be retracted from said installation opening and said slide member can be displaced to a mounting position in which it releases said locking surface, wherein said locking surface projects from a side of said apparatus.

2. A securing arrangement as defined in claim 1, wherein said installation opening is an opening formed in a central console of the motor vehicle.

3. A securing arrangement as defined in claim 1, wherein said apparatus has a laterally projecting element on which said locking surface is formed.

4. A securing arrangement as defined in claim 3, wherein said laterally projecting element is a laterally projecting bracket.

5. A securing arrangement as defined in claim 3, wherein said laterally projecting element is laterally projecting lug.

6. A securing arrangement as defined in claim 1, wherein said apparatus has another locking surface, said locking surface being arranged on sides remote from one another, said slide member engaging said locking surfaces in the locking position.

7. A securing arrangement as defined in claim 1, wherein said apparatus another locking surface arranged so that said locking surfaces are provided on sides remote from one another, said installation opening having another slide member, said slide members engaging said locking surfaces in the locking position.

8. A securing arrangement as defined in claim 1, wherein said slide member has a sliding-engagement surface which extends at an angle to a sliding direction of said slide member and which, on displacement of said slide member from the mounting position to the locking position, slides along said locking surface of said apparatus and presses said apparatus against an abutment.

* * * * *